United States Patent [19]

Cheng

[11] Patent Number: 5,575,197
[45] Date of Patent: Nov. 19, 1996

[54] MODULAR ROASTING PAN HAVING A JOINTER

[76] Inventor: Ching-Hsiung Cheng, No. 45, Alley 21, Lane 373, Sec. 3, Chang Shi Rd., Tainan City, Taiwan

[21] Appl. No.: 540,481

[22] Filed: Oct. 10, 1995

[51] Int. Cl.⁶ .............. A47J 37/00; A47J 37/06; A47J 37/07
[52] U.S. Cl. ............... 99/425; 99/400; 99/446; 126/9 R; 126/41 R
[58] Field of Search ................ 99/375, 400, 401, 99/422–425, 444–446, 450; 126/373, 390, 369, 41 R, 25 R, 9 R

[56] References Cited

U.S. PATENT DOCUMENTS

| | | | |
|---|---|---|---|
| 411,670 | 9/1889 | McCaughey | 99/446 |
| 842,695 | 1/1907 | Peters | 99/446 X |
| 1,447,813 | 3/1923 | Patrick | 99/425 |
| 2,012,520 | 8/1935 | Rogers | 99/425 |
| 2,328,978 | 9/1943 | Hennessey | 99/425 |
| 2,751,840 | 6/1956 | Layton et al. | 99/425 |
| 2,849,949 | 9/1958 | Trachtman | 99/425 |
| 3,199,438 | 8/1965 | Myler et al. | 99/446 X |
| 3,308,747 | 3/1967 | Spagnolo | 99/446 X |
| 3,427,955 | 2/1969 | Menzin | 99/425 |
| 3,659,585 | 5/1972 | Bay | 126/390 |
| 4,608,917 | 9/1986 | Faaborg | 99/400 X |
| 5,105,725 | 4/1992 | Haglund | 99/450 X |

*Primary Examiner*—Timothy F. Simone
*Attorney, Agent, or Firm*—Morton J. Rosenberg; David I. Klein

[57] ABSTRACT

The present invention provides a modular roasting pan having a jointer. A plurality of the disclosed roasting pans may be joined together side by side. In each pan, there is formed a liquid collecting basin having a deep guide segment and a shallow guide segment on opposing sides of the pan. The liquid collecting basin is defined between a raised roasting block and a sidewall structure. On the segments of the sidewall extending transverse to the deep guide segment of the basin are formed joint slots. An elongate tongue is formed on the sidewall segment extending along the shallow guide segment of the basin. On the ends of the tongue are formed two stoppers for inserting engagement with the joint slots of another pan. Two or more pans are joined together by first inserting the tongue of one pan into a joint slot of another, then sliding the first pan relative to the second pan until the two stoppers of the first pan are both inserted into respective joint slots of the second pan.

3 Claims, 3 Drawing Sheets

5,575,197

MODULAR ROASTING PAN HAVING A JOINTER

BACKGROUND OF THE INVENTION

1. Field of the Invention

The present invention is directed to a roasting pan, and more particularly to a modular roasting pan, a plurality of which may be combined according to the number of individuals to be accommodated.

2. Description of the Prior Art

A barbecue has become in past years to be one of the most popular outdoor activities; however, in the prior art barbecue assemblies, there are no substantial provisions to prevent the dripping into the fire or hot coals below of juices from the food being roasted or grilled. Consequently, the fire or other heat source becomes unstable, and excessive smoke is often generated. Furthermore, despite the wide variety of roasting pans commercially available, the sizes of those roasting pans are typically fixed, and they cannot be reconfigured to accommodate a varying number of individuals to be served at one given time.

These and other shortcomings are addressed by the present invention which provides a modular roasting pan with a jointer which may be releasably joined with other such modular roasting pans to accommodate a varying number of individuals attending a given barbecue.

SUMMARY OF THE INVENTION

It is an object of the present invention to provide a modular roasting pan that enables the necessary pan reconfiguration to accommodate a varying number of individuals to be served at a barbecue feast.

It is another object of the present invention to prevent the juices formed in roasting or grilling from dripping into the fire or other heat source below by providing a pan instead of an open grill frame which collects the juices in a manner that also prevents the meat or other product being roasted from soaking in those juices.

It is another object of the present invention to enable the placement of the product being roasted on the coupling joint between joined modular roasting pans by providing two end blocks on the ends of the jointer portion of each modular roasting pan, such that the juices flowing from the edges of the roast product remains contained.

It is yet another object of the present invention to provide a modular roasting pan which is inexpensive to manufacture.

Accordingly, the present invention provides a modular roasting pan having a jointer which may be releasably joined with other such modular roasting pans to enlarge the roasting surface. There is formed in each modular roasting pan a liquid collecting basin portion having a deep guide passage and a shallow guide passage on opposing sides of a roasting block. A sidewall is formed peripherally about the liquid collecting basin portion and the roasting block. Adjacent the deep guide passage, in front and back sections of the sidewall, are respectively formed a pair of L-shaped joint slots. An outer tongue portion having an upside-down L-cross-section is formed on that segment of the sidewall defining the shallow guide passage. On the front and back ends of the outer tongue portion are formed two stopper sections which insert into the L-shaped joint slots of the front and back sidewall segments adjacent the deep guide passage. Two or more modular roasting pans may be joined together by inserting the outer tongue portion of one pan into one of the joint slots of another pan, then pushing one pan relative to the other along the deep guide passage of the other pan until both stopper sections are received respectively within the corresponding joint slots.

DETAILED DESCRIPTION OF THE PREFERRED EMBODIMENT

Figures 1, 2:
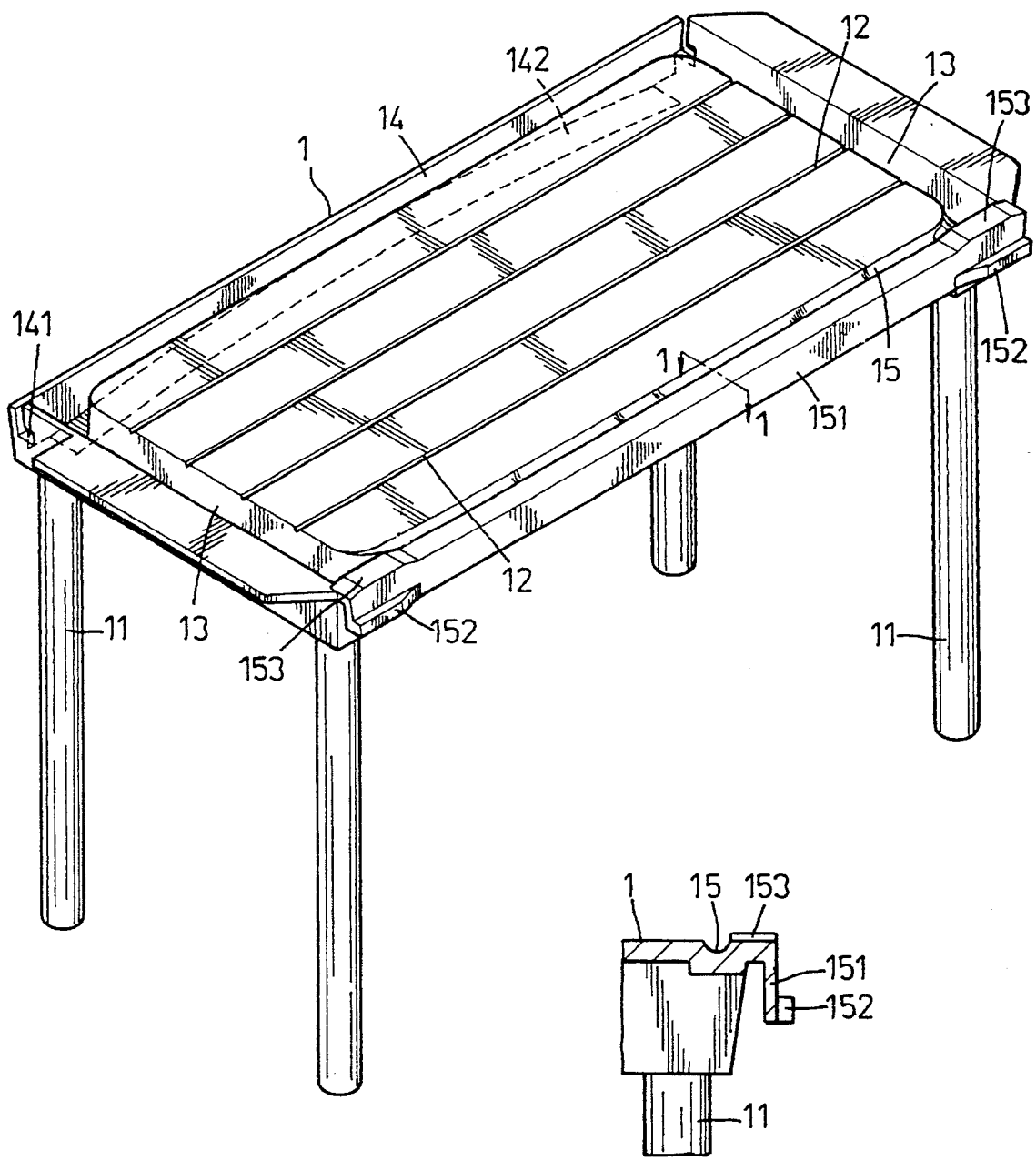
FIG. 1 is a perspective view of the preferred embodiment of the modular roasting pan of the present invention.
FIG. 2 is a cross-sectional view, partially cut-away, taken along Line 1—1 of FIG. 1.
Figure 3:
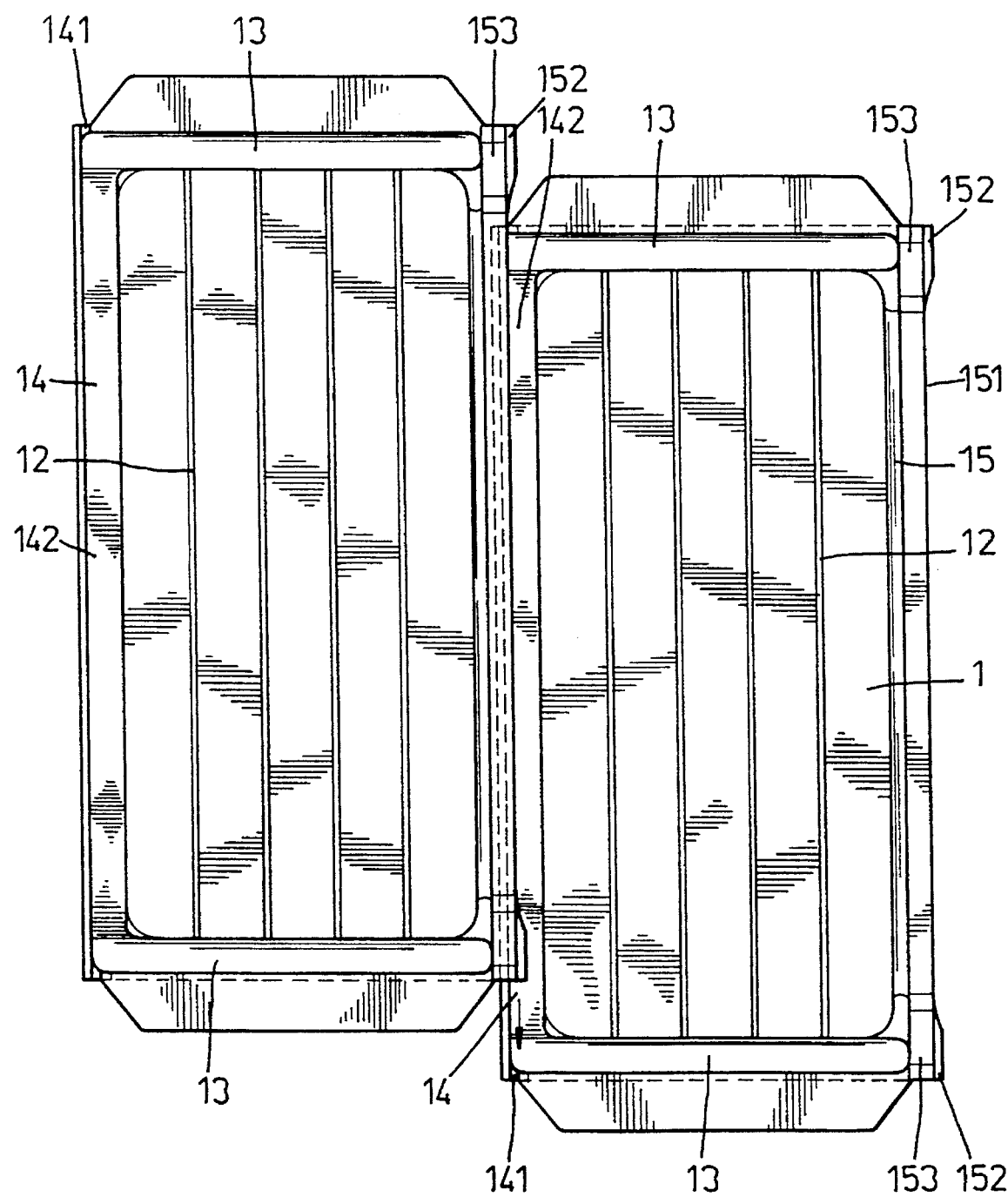
FIG. 3 is a plan view illustrating the jointed coupling of a pair of modular roasting pans in the preferred embodiment of the present invention.
Figure 4:
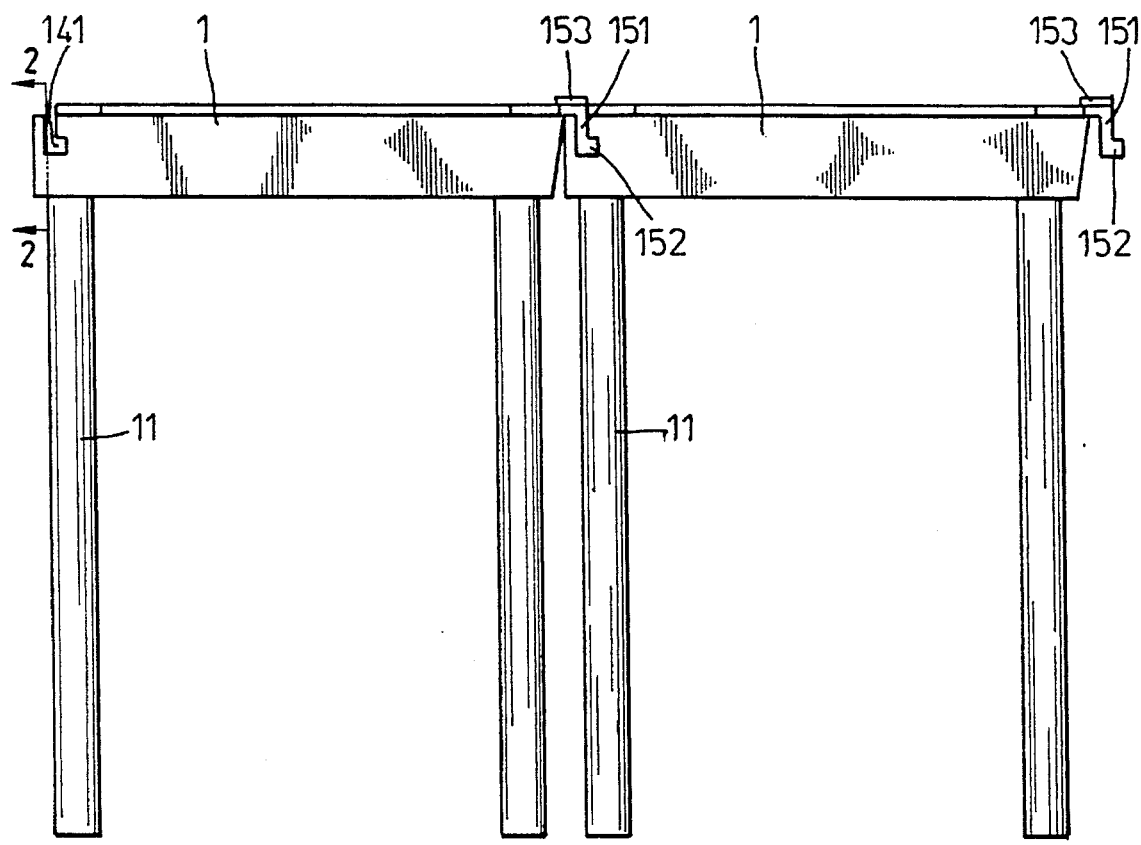
FIG. 4 is an elevational view of a pair of jointed modular roasting pans in the preferred embodiment of the present invention; and, FIG. 5 is a cross-sectional view taken along Line 2—2 of FIG. 4.
Figure 5:
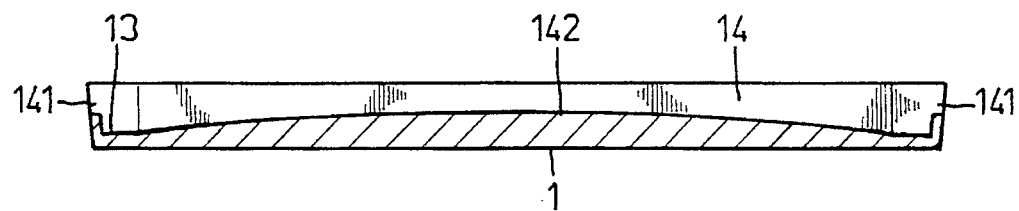

Referring to FIGS. 1–5, there is shown a preferred embodiment of the present invention. On the four corners of roasting pan 1 are fastened four supporting legs 11. A plurality of grooves 12 are formed through the raised roasting block of the pan 1 extending to two segments 13 of a liquid collecting basin which peripherally bounds the raised roasting block. The two segments 13 of the liquid collecting basin are located respectively at the front and back ends of the pan 1. On the right and left sides of the pan 1, there are located a deep guide segment 14 and a shallow guide segment 15 of the liquid collecting basin which connect the segments 13 to form a closed liquid-retaining basin along the periphery of the pan 1. This liquid collecting basin is defined in part by a pan sidewall structure having a segment extending along each segment of the basin portion. On the sidewall segments parallel to the front and rear segments of the basin are formed at the portions thereof adjacent the deep guide segment 14 L-shaped joint slots 141, and the bottom of that deep guide segment 14 is formed with a convexity 142. The segment of the sidewall extending along the shallow guide segment 15 of the liquid collecting basin is formed an elongate, longitudinally-extending tongue 151 which protrudes outwardly. The elongate tongue 151 is formed with an upside-down L cross-sectional shape. Two stoppers 152 are formed on the longitudinal ends of the tongue 151. On the ends of the sidewall segment adjacent tongue 151 are formed upwardly-protruding blocks 153 for blocking the flow of liquids from roast products placed on that sidewall segment.

Two roasting pans 1 are joined by sliding the tongue 151 of a first pan 1 through a joint slot 141 of a second pan 1, then along the deep guide segment 14 thereof, until the stoppers 152 of the first pan 1 each engage a joint slot 141 of the second pan 1. In the same manner, as many pans 1 as necessary may be joined together. Joined pans 1 may be disassembled by reversing this operation.

I claim:

1. A modular roasting pan comprising:
   (a) a bottom portion;
   (b) a plurality of support leg members coupled to said bottom portion;
   (c) a roasting block portion formed on said bottom portion, said roasting block portion having a substantially planar upper surface raised relative to said bottom portion in an upward direction; said upper surface having formed therein a plurality of grooves;

(d) a sidewall portion extending in said upward direction from said bottom portion, said sidewall portion being formed substantially about said roasting block portion to define a liquid collecting basin portion peripherally bounding said roasting block portion, said sidewall portion having first and second segments extending in a longitudinal direction and front and back segments coupled to said second segment to extend in a transverse direction therefrom, said front and back segments each having formed therein adjacent said second segment a slot having a predetermined contour; and, (e) an outer tongue portion formed on said first segment of said sidewall portion, said outer tongue portion being adapted to form a releasable tongue and groove coupling with said second segment of said sidewall portion of a second said modular roasting pan, said outer tongue portion having formed thereon at least a pair of stopper sections adapted to be respectively received within said slots of said front and back segments of said sidewall portion of said second modular roasting pan to releasably secure said tongue and groove coupling.

2. The modular roasting pan as recited in claim 1 wherein said bottom portion is characterized at a section thereof adjacent said second segment of said sidewall portion by a substantially convex cross-sectional contour.

3. The modular roasting pan as recited in claim 1 wherein said first segment of said sidewall portion has formed thereon adjacent longitudinally distal ends thereof a pair of upwardly protruding end block sections.

* * * * *